Oct. 14, 1958 S. O. JONES ET AL 2,856,510
INERT GAS SHIELD FOR WELDING
Filed Sept. 11, 1956

INVENTOR.
BY Francis V. Daly
Samuel O. Jones

ATTORNEY

United States Patent Office 2,856,510
Patented Oct. 14, 1958

2,856,510

INERT GAS SHIELD FOR WELDING

Samuel O. Jones, Newport News, and Francis V. Daly, Hampton, Va., assignors to the United States of America as represented by the United States Atomic Energy Commission Application September 11, 1956, Serial No. 609,329

2 Claims. (Cl. 219—74)

The present invention relates to welding methods and more especially to a novel method of and apparatus for welding alloys rich in zirconium, such as zircaloy-2.

Zirconium and alloys rich in zirconium such as zircaloy-2 are so chemically active that they become contaminated at the elevated welding temperatures unless the atmosphere is completely excluded by inert gas. The alloy zircaloy 2 contains 1.5–1.65% tin, 0.1–0.17% iron, 0.07–0.14% chromium, 0.05–0.07% nickel, and a maximum of 0.009% nitrogen. This alloy has previously been welded only in a dry box completely surrounding the work, and then only in thicknesses where no filler metal was required in the joint. If the alloy were to be used in fabricating large pressure vessels, such as are required for homogeneous nuclear reactors, it was believed that the welding would have to be done in a dry box or controlled atmosphere chamber of greater size than the vessel.

The disadvantages of trying to achieve successful welds for a large vessel completely enclosed in a large chamber are obvious. A manual welding apparatus and a novel welding procedure which would eliminate the costly and cumbersome large dry box and enable ordinary skilled welders to weld zircaloy-2 seams in the down-hand position would be much more desirable. Accordingly it is the principal object of our invention to provide a novel method for welding alloys rich in zirconium, which method can be carried out in the normal welding position and does not require any controlled atmosphere chambers enclosing the work. Another object of the invention is to provide novel welding apparatus which successfully performs the essential functions of the welding dry box but avoids the costly and cumbersome structure, and which lends itself to normal welding techniques. A primary object of the invention is to provide novel means for seam welding zirconium alloys more rapidly, economically, and easily, without sacrificing the quality of the resulting welds. These and other objects of our invention will become apparent from the following detailed description of a preferred embodiment thereof, when read in connection with the appended drawings, wherein:

Figure 1:
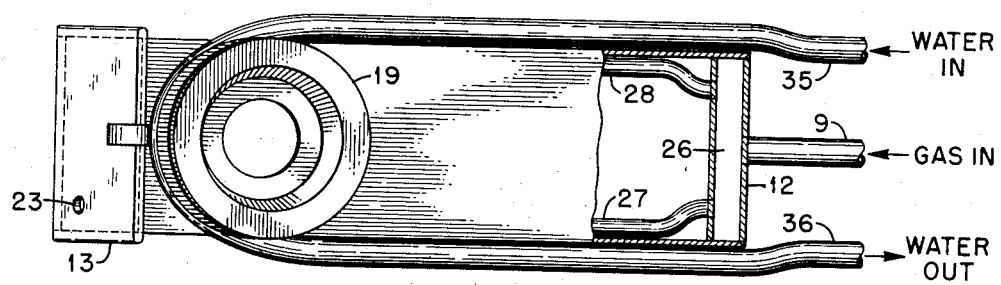
Figure 1 is a plan view of one form of our novel apparatus.
Figure 3:
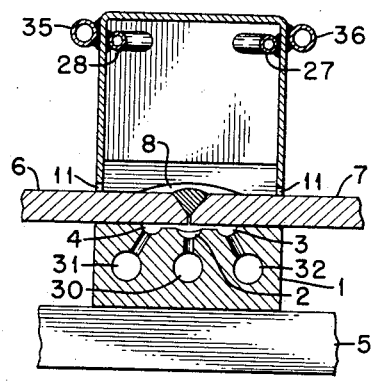
Figure 3 is a transverse section across the welding apparatus.
Figure 2:
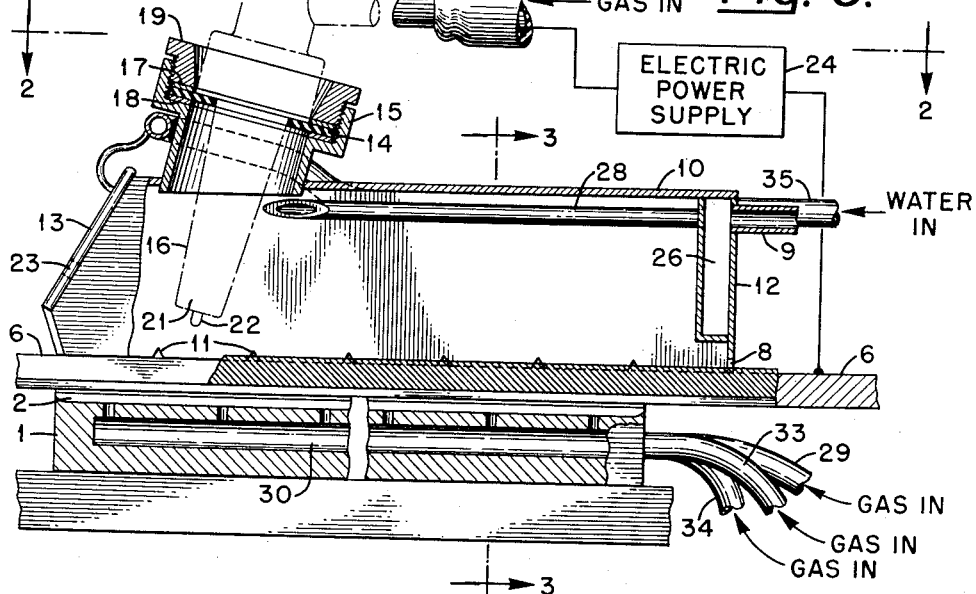
Figure 2 is a longitudinal section of a novel welding apparatus in place over a seam to be welded.

We have found that satisfactory welding of the zirconium rich alloys may be accomplished by contacting the edges of the pieces to be joined to form a seam over a longitudinal groove in a back-up bar, striking a welding arc between the work and a tungsten electrode, continuously supplying inert gas around the arc as a shield, continuously supplying inert gas to the underside of the weld through the groove in the back-up bar, moving the arc along the line to weld the pieces together, continuously supplying additional inert gas and confining the additional gas in a region over the weld and behind the arc for a time long enough to shield the weld from the atmosphere until it has cooled sufficiently, and continuously cooling the gas so confined over the weld.

Referring now to the attached drawings, the figures show suitable apparatus with which our novel method may be practiced. The apparatus comprises generally a hollow, grooved back up bar for supplying inert gas continuously to the underside of the weld, a welding torch provided with a nozzle to receive arc-shielding gas, and a torch carrier provided with a trailing shield defining an inert gas-filled chamber behind the arc. The hollow copper bar 1 may be supported upon a suitable stand or surface or may be clamped to the underside of the work, which is aligned so that the confronting edges forming the seam to be welded are aligned over the central groove 2 in the bar. Parallel grooves 3, 4 lie on opposite sides of the center groove, and each groove is provided with a row of spaced apertures communicating with a longitudinal passageway within the bar.

The welding torch carrier and trailing shield may comprise a metal channel 10 having edges which are adapted to slide over the work pieces and which are provided with small gas escape notches 11. A rear end plate 12 and an inclined, transparent end window 13 close the channel at opposite ends to provide a substantially closed chamber. The welding torch 16 is mounted in the carrier in a rubber mounting 14 in upstanding boss 15. Metal washers 17, 18 are provided on opposite sides of the rubber diaphragm 14, and the entire assembly is maintained in place by a threaded cap 19 which engages an internally threaded portion of boss 15. Gas is supplied to the torch through side arm 20 from a suitable source of gas. The gas flows down the body of the torch and exits in a nozzle 21 surrounding the welding electrode 22 to shield the welding arc.

Filler wire may be fed to the weld through aperture 23. The voltage for the welding arc may be derived from a conventional source of potential 24 which is connected between the work piece and electrode 22.

Gas from a second source is introduced into the trailing shield portion by means of a tube 9 entering manifold 26, which is attached to the rear end wall 12 of the shield. From the manifold a pair of tubes 27, 28 lead forward along opposite side walls to a point just behind the welding torch, where gas escapes from the open ends of the tubes to fill the rear shield portion of the channel. Additional gas is provided from a suitable external source through flexible tubes 29, 33, 34 to the central longitudinal passageway 30 in the back-up bar, and to the parallel longitudinal passageways 31, 32. The gas flows up into the horizontal grooves 2, 3, 4 through slots connected to the passageways.

Cooling water is supplied to the torch mounting and also to the channel 10. The water may come from a suitable external source through lead 35, run through the tubing adjacent the top edge of the channel, pass around the rubber mounting, and return to source through lead 36. Cooling water may also be supplied to the central passageway 30 of the back-up bar for cooling, if desired, in which case the vertical slots to groove 2 would not be present, but such water cooling has not been found necessary. A source of cooling water is also connected to the torch 16, as in conventional operation.

The length of the trailing shield portion is made such that under normal conditions the deposited weld and the adjacent heat affected zones are protected until the temperature of the weld drops to substantially 700–1000 degrees F. In practice the shield is made sufficiently long so that at normal welding speed the affected portions will be completely shielded until the desired temperatures have been reached as the welding operation progresses along the seam.

We have found that commercial grades of helium and argon are acceptable for use as shielding gases. Helium provides deeper penetration and allows for production of near porosity-free weld deposits. Optimum results are obtained when shielding gases are employed as follows: Torch-helium at 30–40 cu. ft. per hr.; shield-argon at 75 cu. ft. per hr.; back-up plate-helium at 30–40 cu. ft. per hr.

It has also been found that conventional U-groove preparation of the welding joints is satisfactory. Such joints include 1/16" root land, 3/16" root radius, and a 40° included angle. The root bead is produced by fusing together the metal at the root of the joint with the inert gas shielded tungsten arc torch without the addition of filler metal.

Filler wire has been successfully used in fabrication of enclosed vessels. In a typical welding operation, a filler metal insert of zircaloy-2 wire was tack welded to the root nose of one of the workpieces. The surface near the joint was ground to remove all oxide film for about 1" from the edge. The surfaces were wire brushed to remove burrs and cleaned with acetone. The workpieces were tack welded together without any filler wire by fusing a small area of the top of a consumable insert to each side of the joint with a tungsten electrode. As each tack weld was completed, the gas cup of the welding torch was maintained in position to cover the fused area during the time required for the weld and surrounding regions to cool sufficiently to prevent contamination. Gas was directed to the underside of the weld through the back-up plate to protect the root side. Preformed zircaloy-2 end tabs were next welded to the workpieces to extend the joint at each end. The joints were again brushed and swabbed with acetone. The torch with the trailing shield was then placed on the surface of the workpieces, beginning at one side, the welding arc was struck, and the sliding torch carrier was moved along over the seam, while the shielding gases were being supplied to the arc, to the trailing shield, and to the underside of the weld. Filler wire was fed manually into the weld puddle through a small aperture 23 in the front window.

It will be apparent to those skilled in the art that we have provided a novel method of and apparatus for welding zirconium-rich alloys, and have provided novel manual welding apparatus for excluding the atmosphere from the welding surfaces and the associated heat affected regions not only during the actual welding but also during the cooling period when the weld is subject to contamination. By exclusion of the atmosphere during both periods, welds of excellent strength and porosity characteristics have been achieved and strong zirconium vessels have been fabricated.

Having described our invention, what is claimed as novel is:

1. Apparatus for welding a seam between two abutting metal workpieces to prevent atmospheric contamination of the weld comprising a welding torch provided with an electrode and a nozzle, an elongated, inverted channel straddling said seam and provided with edges contacting each workpiece, a rear end wall and an apertured, transparent front end wall closing said channel to form an enclosed chamber above said seam, means for mounting said torch in said channel adjacent said front wall and above said seam, a source of inert gas, a first gas conduit connecting said source and said nozzle to supply gas about the welding arc, second and third gas conduits having respective open ends disposed within said enclosed chamber and opposite ends connected to said source to supply gas to shield the seam behind said arc, a back-up bar contacting said workpieces on the side opposite said channel and provided with an apertured groove aligned with said seam, a fourth gas conduit connecting said source with said bar to supply gas to shield said seam through said apertured groove, and respective means for cooling said channel to cool said seam while it is shielded by said gas.

2. Apparatus for seam welding zirconium rich alloys to prevent atmospheric contamination with the weld comprising a welding torch provided with an electrode and a nozzle, means for striking an arc between said torch electrode and a work piece, a torch mount comprising an U-shaped elongated channel member closed at both ends and provided with side walls contacting the respective workpieces and adapted to slide therealong and straddle said seam during welding, means for supplying helium to said welding torch to shield the arc, means for supplying argon to the enclosed space above the seam between said side walls including a header section and a pair of conduits extending from said header along opposite side walls and terminating adjacent said torch to shield the welded seam as the mount is moved along the seam at a selected speed, the length of said channel extending behind said electrode and the rate of flow of gas being such that the welded seam is cooled to less than substantially 1000° Fahrenheit in the gas-filled chamber formed by said channel before it is exposed to the atmosphere, a grooved back-up bar contacting the underneath side of said workpieces, said bar being provided with a gas conduit parallel to the groove therein and connected to said groove through a plurality of longitudinally spaced apertures, means for supplying helium to said groove to cool the root of the weld, a source of cooling water, and cooling water conduits disposed in heat exchange relation with the walls of said channel and said torch to cool both said torch and said argon simultaneously.

References Cited in the file of this patent

UNITED STATES PATENTS

| | | |
|---|---|---|
| 1,552,369 | White | Sept. 1, 1925 |
| 1,711,151 | Lincoln | Apr. 30, 1929 |
| 2,528,758 | King | Nov. 7, 1950 |
| 2,590,084 | Bernard | Mar. 25, 1952 |
| 2,644,070 | Herbst | June 30, 1953 |

FOREIGN PATENTS

| | | |
|---|---|---|
| 947,597 | France | Jan. 10, 1949 |